(12) United States Patent
Matsumoto

(10) Patent No.: US 9,030,062 B2
(45) Date of Patent: May 12, 2015

(54) COOLING STRUCTURE OF ROTATING ELECTRIC MACHINE

(75) Inventor: Katsunari Matsumoto, Miyoshi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 327 days.

(21) Appl. No.: 13/502,059

(22) PCT Filed: Oct. 16, 2009

(86) PCT No.: PCT/JP2009/067877
§ 371 (c)(1),
(2), (4) Date: Apr. 13, 2012

(87) PCT Pub. No.: WO2011/045860
PCT Pub. Date: Apr. 21, 2011

(65) Prior Publication Data
US 2012/0200179 A1  Aug. 9, 2012

(51) Int. Cl.
*H02K 9/19* (2006.01)
*H02K 1/32* (2006.01)

(52) U.S. Cl.
CPC ... *H02K 9/19* (2013.01); *H02K 1/32* (2013.01)

(58) Field of Classification Search
USPC ............... 310/52–64, 43, 156.53–156.56
See application file for complete search history.

(56) References Cited

U.S. PATENT DOCUMENTS

| | | | |
|---|---|---|---|
| 4,691,131 A * | 9/1987 | Nakano | 310/54 |
| 6,069,421 A * | 5/2000 | Smith et al. | 310/43 |
| 8,044,542 B2 * | 10/2011 | Masuda et al. | 310/56 |
| 2003/0132673 A1 | 7/2003 | Zhou et al. | |
| 2009/0174273 A1 | 7/2009 | Watanabe et al. | |

FOREIGN PATENT DOCUMENTS

| | | |
|---|---|---|
| JP | 64-055039 A | 3/1989 |
| JP | 6-48355 U | 6/1994 |
| JP | 9-182375 A | 7/1997 |
| JP | 2001-16826 A | 1/2001 |
| JP | 2002-345188 A | 11/2002 |
| JP | 2003-219607 A | 7/2003 |
| JP | 2004-222347 A | 8/2004 |
| JP | 2005-198451 A | 7/2005 |
| JP | 2006-006091 A | 1/2006 |

(Continued)

OTHER PUBLICATIONS

JP 2009171785 A and JP 2009195089 A machine translation Mar. 8, 2014.*

(Continued)

*Primary Examiner* — Dang Le
*Assistant Examiner* — Leda Pham
(74) *Attorney, Agent, or Firm* — Sughrue Mion, PLLC

(57) ABSTRACT

A cooling structure of a rotating electric machine includes a rotor core formed of a plurality of electromagnetic steel plates and a resin molding portion molding the rotor core with resin. The rotor core is provided with a through hole passing therethrough in the axial direction of the central axis that is a rotation axis. The rotor core is provided inside the through hole with an oil passage through which oil circulates. The resin molding portion has a cover portion covering the outer peripheral side of the oil passage. This configuration can provide the cooling structure of the rotating electric machine that achieves efficient cooling while suppressing occurrence of energy loss.

8 Claims, 5 Drawing Sheets

(56) References Cited

FOREIGN PATENT DOCUMENTS

| JP | 2006-067777 A | | 3/2006 |
|---|---|---|---|
| JP | 2008-178243 A | | 7/2008 |
| JP | 2009-071923 A | | 4/2009 |
| JP | 2009171785 A | * | 7/2009 |
| JP | 2009195089 A | * | 8/2009 |
| WO | 2007/026900 A1 | | 3/2007 |

OTHER PUBLICATIONS

International Search Report of PCT/JP2009/067877 dated Jan. 12, 2010.

* cited by examiner

… (1)

COOLING STRUCTURE OF ROTATING ELECTRIC MACHINE

TECHNICAL FIELD

The present invention generally relates to a cooling structure of a rotating electric machine, and more particularly to a cooling structure of a rotating electric machine including a rotor core formed of laminated steel plates.

BACKGROUND ART

With regard to the conventional cooling structure of the rotating electric machine, for example, Japanese Patent Laying-Open No. 2009-71923 discloses a cooling structure of an electric motor aiming at implementing size reduction by providing a pump within the electric motor (PTL 1). In the cooling structure of the electric motor disclosed in PTL 1, a rotor core is provided with a plurality of cooling oil passages passing therethrough and extending in the vicinity of a permanent magnet.

Furthermore, Japanese Utility Model Laying-Open No. 06-48355 discloses a rotator of a rotating electric machine aiming at improving cooling efficiency (PTL 2). In the rotator of the rotating electric machine disclosed in PTL 2, the iron core of the rotator is provided with a vent hole extending inclined with respect to the rotator axis.

Furthermore, Japanese Patent Laying-Open No. 2002-345188 discloses a rotating electric machine aiming at directly and efficiently cooling a permanent magnet without reducing output power (PTL 3). In the rotating electric machine disclosed in PTL 3, the iron core of the rotator is provided with a magnet insertion hole into which a permanent magnet is inserted and fixed therein. The permanent magnet is further provided on its inner peripheral side surface with a cooling passage through which a coolant is guided along the magnet insertion hole.

Examples of literature disclosing the conventional cooling structure of the rotating electric machine may include Japanese Patent Laying-Open No. 2001-16826 (PTL 4) and Japanese Patent Laying-Open No. 2005-198451 (PTL 5).

CITATION LIST

Patent Literature

PTL 1: Japanese Patent Laying-Open No. 2009-71923
PTL 2: Japanese Utility Model Laying-Open No. 06-48355
PTL 3: Japanese Patent Laying-Open No. 2002-345188
PTL 4: Japanese Patent Laying-Open No. 2001-16826
PTL 5: Japanese Patent Laying-Open No. 2005-198451

SUMMARY OF INVENTION

Technical Problem

In the electric motor disclosed in PTL 1 as described above, cooling oil cools the permanent magnet disposed in the vicinity of the cooling oil passage while circulating through the cooling oil passage within the rotor core. After being discharged from the cooling oil passage, the cooling oil further cools a coil end and a stator coil.

However, in the case where the rotor core is formed of laminated steel plates, the cooling oil circulating through the cooling oil passage enters the gap between the laminated steel plates due to centrifugal force and penetrates into the gap between the rotor core and the stator core. This may lead to occurrence of resistance due to dragging of the cooling oil between the rotor core and the stator core, thereby causing unexpected energy loss to occur in driving of the electric motor.

Thus, an object of the present invention is to solve the above-described problems and to provide a cooling structure of a rotating electric machine achieving efficient cooling while restraining occurrence of energy loss.

Solution to Problem

A cooling structure of a rotating electric machine according to the present invention includes a rotor core formed of laminated steel plates and a resin molding portion molding the rotor core with resin. The rotor core is provided with a through hole passing therethrough in a direction of a rotation axis. The rotor core is provided inside the through hole with a coolant passage through which a coolant circulates. The resin molding portion has a cover portion covering an outer peripheral side of the coolant passage.

According to the cooling structure of the rotating electric machine configured in this way, the cover portion is provided in the resin molding portion, thereby preventing the coolant circulating through the coolant passage from entering the gap between the laminated steel plates. This prevents occurrence of resistance by the coolant intervening between the rotor and the stator during rotation of the rotor core. Consequently, the rotating electric machine can be efficiently cooled while restraining occurrence of energy loss when the rotating electric machine is driven.

Further preferably, the rotor core has a first end face and a second end face facing one end and the other end, respectively, in the direction of the rotation axis. The coolant passage is open to the first end face and the second end face. The cooling structure of the rotating electric machine further includes a coolant supply portion supplying the coolant onto the first end face. The cover portion is configured to have a thickness that is greater on a side of the first end face than on a side of the second end face.

According to the cooling structure of the rotating electric machine configured in this way, during rotation of the rotor core, the difference of the thickness in the cover portion between the first end face side and the second end face side is utilized to allow the coolant supplied from the coolant supply portion to smoothly circulate from the first end face side to the second end face side of the coolant passage. Consequently, the cooling efficiency of the rotating electric machine can be improved.

Further preferably, the rotor core has an end face facing in the direction of the rotation axis. The coolant passage is open to the end face. The cooling structure of the rotating electric machine further includes a coolant supply portion supplying the coolant onto the end face. The resin molding portion further has a protruding portion. The protruding portion is provided on the end face so as to extend along an edge on an outer peripheral side of an opening plane of the coolant passage. This protruding portion protrudes in the direction of the rotation axis of the rotor core.

According to the cooling structure of the rotating electric machine configured in this way, the coolant supplied from the coolant supply portion onto the end face of the rotor core can be guided by the protruding portion to the coolant passage within the through hole. Consequently, the cooling efficiency of the rotating electric machine can be improved.

Further preferably, the rotor core has a first end face and a second end face facing one end and the other end, respectively, in the direction of the rotation axis. The coolant passage is open to the first end face and the second end face. A plurality of the through holes are provided spaced apart from each other in a circumferential direction centering on the rotation axis of the rotor core. The cooling structure of the rotating electric machine further includes a first coolant supply portion supplying the coolant onto the first end face and a second coolant supply portion supplying the coolant onto the second end face. The first coolant supply portion and the second coolant supply portion are located displaced from each other in the circumferential direction centering on the rotation axis of the rotor core.

The cooling structure of the rotating electric machine configured in this way allows formation of the coolant flow supplied from the first coolant supply portion onto the first end face of the rotor core and flowing through the coolant passage within the through hole toward the second end face, and the coolant flow supplied from the second coolant supply portion onto the second end face of the rotor core and flowing through the coolant passage within the through hole toward the first end face.

Further preferably, the through hole through which the coolant supplied from the first coolant supply portion circulates is provided with the cover portion configured to have a thickness that is greater on a side of the first end face than on a side of the second end face. The through hole through which the coolant supplied from the second coolant supply portion circulates is provided with the cover portion configured to have a thickness that is greater on the side of the second end face than on the side of the first end face.

According to the cooling structure of the rotating electric machine configured in this way, during rotation of the rotor core, the difference of the thickness in the cover portion between the first end face side and the second end face side is utilized to allow the coolant to smoothly circulate between the first end face side and the second end face side of the coolant passage. Consequently, the cooling efficiency of the rotating electric machine can be improved.

Further preferably, the cooling structure of the rotating electric machine further includes a magnet inserted into the through hole. The resin molding portion is provided so as to fill a space between the magnet and an inner wall of the through hole. The magnet and the coolant passage are disposed inside the through hole so as to have the cover portion interposed therebetween.

According to the cooling structure of the rotating electric machine configured in this way, the coolant passage is formed across the cover portion from the magnet, thereby allowing efficient cooling of the magnet generating heat in accordance with rotation of the rotor core. Furthermore, the coolant passage having an outer periphery covered by the cover portion can be formed during molding with resin for fixing the magnet inserted into the through hole.

Further preferably, the rotor core has a first end face and a second end face facing one end and the other end, respectively, in the direction of the rotation axis. The resin molding portion is provided continuously between the first end face and the second end face while covering the first end face and the second end face, to integrally hold the rotor core formed of the laminated steel plates.

According to the cooling structure of the rotating electric machine configured in this way, the coolant passage having an outer periphery covered by the cover portion can be formed during molding with resin for integrally forming the rotor core formed of laminated steel plates.

Further preferably, the cooling structure of the rotating electric machine further includes a stator core disposed on an outer periphery of the rotor core and a coil wound around the stator core. The stator core has an end face facing in the direction of the rotation axis of the rotor core. The coil has a coil end portion positioned on the end face of the stator core.

According to the cooling structure of the rotating electric machine configured in this way, the coil, particularly the coil end portion, can be cooled by the coolant circulating through the coolant passage and scattered on the end face of the stator core.

Further preferably, the rotor core has a first end face and a second end face facing one end and the other end, respectively, in the direction of the rotation axis. The coolant passage is open to the first end face and the second end face. The cooling structure of the rotating electric machine further includes a coolant supply portion supplying the coolant onto the first end face. The resin molding portion has a guide portion. The guide portion is disposed on the second end face and formed to guide the coolant discharged through the coolant passage toward the coil end portion.

According to the cooling structure of the rotating electric machine configured in this way, the coolant circulating through the coolant passage and discharged onto the second end face can be efficiently guided to the coil end portion.

Advantageous Effects of Invention

As described above, the present invention can provide a cooling structure of a rotating electric machine achieving efficient cooling while suppressing occurrence of energy loss.

DESCRIPTION OF EMBODIMENTS

Figure 1:
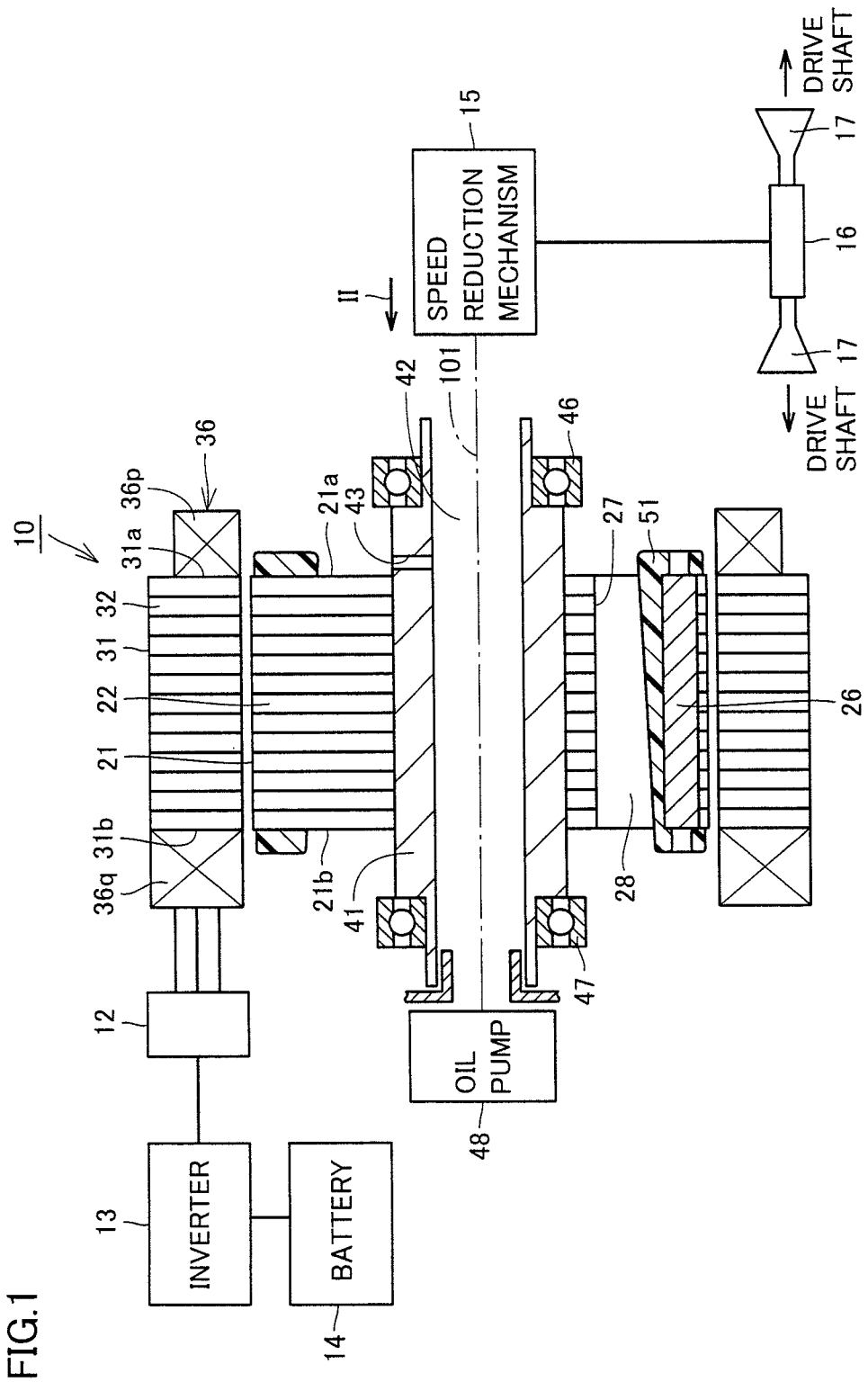
FIG. 1 is a cross sectional view schematically showing a vehicle driving unit.

Embodiments of the present invention will be hereinafter described with reference to the accompanying drawings, in which the same or corresponding components are designated by the same reference characters.

First Embodiment

FIG. 1 is a cross sectional view schematically showing a vehicle driving unit. The vehicle driving unit shown in the figure is provided in a hybrid vehicle utilizing, as a power source, an internal combustion engine such as a gasoline engine and a diesel engine, and a motor receiving supply of electric power from a chargeable and dischargeable secondary cell (battery).

Referring to FIG. 1, the vehicle driving unit includes a motor generator 10. Motor generator 10 is a rotating electric machine functioning as an electric motor or a power generator in accordance with the running state of the hybrid vehicle.

Motor generator 10 consists of components including a rotor shaft 41, a rotor core 21 and a stator core 31. Rotor core 21 integrated with rotor shaft 41 rotates about a central axis 101 as a virtual axis. In other words, central axis 101 is a rotation axis of rotor core 21. Stator core 31 is disposed on the outer periphery of rotor core 21.

Rotor shaft 41 extends in the axial direction of central axis 101. Rotor shaft 41 has a cylindrical shape having a hollow portion 42 provided therein. Rotor shaft 41 is supported through a bearing 46 and a bearing 47 provided spaced apart from each other in the axial direction of central axis 101 such that it is rotatable with respect to the motor case as a case body that is not shown. Rotor shaft 41 is connected to a speed reduction mechanism 15 formed by a plurality of gears.

Rotor shaft 41 has one end provided with an oil pump 48. Oil pump 48 is a gear-type oil pump discharging the oil in accordance with rotation of rotor shaft 41. The oil discharged from oil pump 48 is introduced into hollow portion 42 for the purpose of cooling or lubricating each part in motor generator 10. Rotor shaft 41 is provided with an oil supply hole 43 for causing the oil introduced into hollow portion 42 to be supplied toward rotor core 21 and stator core 31.

In addition, the means for supplying the oil to hollow portion 42 is not limited to a pump as shown in the figure, but may be, for example, a mechanism for gathering the oil scraped by the gear into a catch tank and guiding the oil to hollow portion 42 by gravity.

Rotor core 21 has a shape cylindrically extending in the axial direction of central axis 101. Rotor core 21 is formed of a plurality of electromagnetic steel plates 22 stacked in the axial direction of central axis 101. Electromagnetic steel plate 22 is formed in the shape of a disc having a shape of a flat plate extending in the flat plane orthogonal to central axis 101.

Rotor core 21 has an end face 21a facing one end in the direction in which central axis 101 extends and an end face 21b facing the other end in the direction in which central axis 101 extends. End face 21a and end face 21b each extend in the flat plane orthogonal to central axis 101. In the present embodiment, end face 21a and end face 21b are formed by the surfaces of electromagnetic steel plate 22 located in both ends in the axial direction of central axis 101.

Motor generator 10 further includes a permanent magnet 26 and a resin molding portion 51 as components thereof. A plurality of permanent magnets 26 are buried in rotor core 21. Resin molding portion 51 is formed of resin. Resin molding portion 51 locally covers the surface of rotor core 21 so as to integrally hold rotor core 21 formed of a plurality of electromagnetic steel plates 22 and to fix permanent magnet 26 to rotor core 21.

Stator core 31 has a shape cylindrically extending in the axial direction of central axis 101. Stator core 31 is formed of a plurality of electromagnetic steel plates 32 stacked in the axial direction of central axis 101. Stator core 31 has an end face 31a facing one end in the direction in which central axis 101 extends and an end face 31b facing the other end in the direction in which central axis 101 extends. End face 21a and end face 31a are formed to extend approximately on the same plane. End face 21b and end face 31b are formed to extend approximately on the same plane.

Motor generator 10 further includes a coil 36 as a component thereof. Coil 36 is wound around stator core 31. Coil 36 is formed of an insulation-coated copper wire, for example. Coil 36 has a coil end portion 36p and a coil end portion 36q. Coil end portion 36p and coil end portion 36q are formed so as to protrude from end face 31a and end face 31b, respectively, in the axial direction of central axis 101. Coil end portions 36p and 36q located on end faces 31a and 31b, respectively, are provided so as to revolve around central axis 101 in an annular manner.

Coil 36 is configured to include U-phase, V-phase and W-phase coils. The terminals corresponding to their respective phase coils are connected to a terminal block 12. Terminal block 12 is electrically connected to a battery 14 through an inverter 13. Inverter 13 converts the direct current from battery 14 into an alternating current for driving a motor, and also converts the alternating current generated by a regenerative brake into a direct current for charging battery 14.

The motive power output from motor generator 10 is transmitted from speed reduction mechanism 15 through a differential mechanism 16 to a drive shaft receiving portion 17. The motive power transmitted to drive shaft receiving portion 17 is transmitted as rotational force through a drive shaft to wheels that are not shown.

On the other hand, during regenerative braking of a hybrid vehicle, wheels are rotated by the inertial force of the vehicle body. Motor generator 10 is driven by the rotational force from the wheels through drive shaft receiving portion 17, differential mechanism 16 and speed reduction mechanism 15. In this case, motor generator 10 operates as a power generator. The electric power generated by motor generator 10 is stored in battery 14 through inverter 13.

Figure 2:
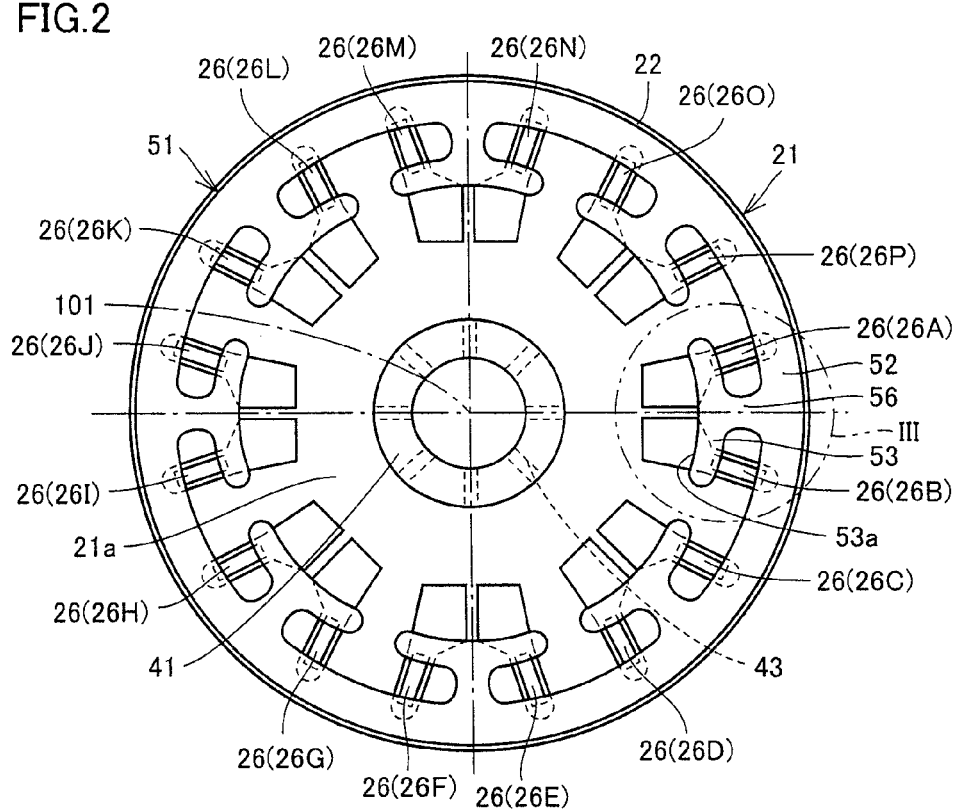
FIG. 2 is an end view of a motor generator as seen in the direction shown by an arrow II in FIG. 1.
Figure 3:
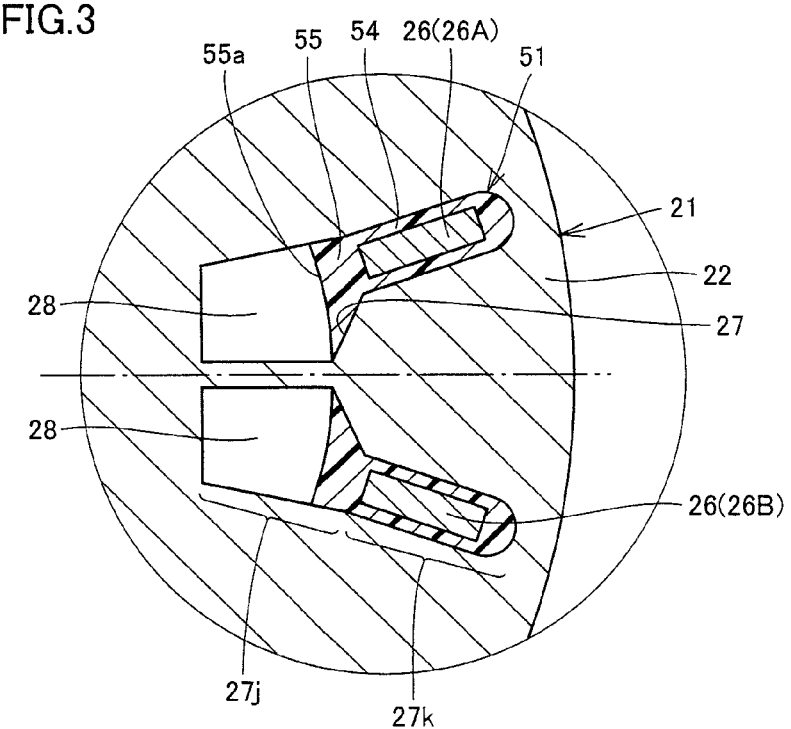
FIG. 3 is an enlarged cross sectional view of the area surrounded by an alternate long and two short dashes line III in FIG. 2.

FIG. 2 is an end view of the motor generator as seen in the direction shown by an arrow II in FIG. 1. FIG. 3 is an enlarged cross sectional view of the area surrounded by an alternate long and two short dashes line III in FIG. 2.

Referring to FIGS. 1 to 3, a plurality of through holes 27 are formed in rotor core 21. Through hole 27 is formed so as to extend in the axial direction of central axis 101 and pass through rotor core 21. Through hole 27 is formed so as to be open to end face 21a and end face 21b of rotor core 21. A plurality of through holes 27 are provided spaced apart from each other in the circumferential direction centering on central axis 101.

As seeing in the axial direction of central axis 101, through hole 27 is formed of a broad width portion 27j and a narrow width portion 27k (see FIG. 3). Broad width portion 27j has a relatively broad width in the circumferential direction centering on central axis 101 while narrow width portion 27k has a relatively narrow width in the circumferential direction centering on central axis 101. Narrow width portion 27k is located to face stator core 31 in the radial direction centering on central axis 101. Broad width portion 27j is located on the inner peripheral side with respect to narrow width portion 27k.

Permanent magnet 26 is inserted into each through hole 27. A minute gap exists between permanent magnet 26 and the inner wall of through hole 27. Permanent magnet 26 is disposed in narrow width portion 27k.

In the present embodiment, permanent magnets 26A, 26B, 26C, 26D, 26E, 26F, 26G, 26H, 26I, 26J, 26K, 26L, 26M, 26N, 26O, and 26P are arranged in this order in the circumferential direction. In addition, the number of permanent magnets 26 shown in FIG. 2 is merely by way of example and is selected as appropriate in accordance with the performance and the like required by motor generator 10.

Resin molding portion 51 is provided so as to partially cover end face 21a and end face 21b of rotor core 21 and to sandwich rotor core 21 held between its end face 21a and end face 21b. Furthermore, resin molding portion 51 is provided so as to fill the gap between permanent magnet 26 and the inner wall of through hole 27.

More specifically describing the shape of resin molding portion 51, resin molding portion 51 is configured to include an outer peripheral portion 52, an inner peripheral portion 53 as a protruding portion, a gap filling portion 54, a cover portion 55, and an intermediate portion 56.

Outer peripheral portion 52, inner peripheral portion 53 and intermediate portion 56 are provided on end face 21a and end face 21b of rotor core 21. Outer peripheral portion 52, inner peripheral portion 53 and intermediate portion 56 are provided so as to protrude from end face 21a and end face 21b in the axial direction of central axis 101.

Outer peripheral portion 52 is provided so as to continuously extend in the circumferential direction centering on central axis 101. Outer peripheral portion 52 is provided so as to annularly extend centering on central axis 101. Outer peripheral portion 52 is provided so as to cover the end on the outer peripheral side of permanent magnet 26 and exposed in end face 21a and end face 21b.

Inner peripheral portion 53 is provided so as to intermittently extend in the circumferential direction centering on central axis 101. Inner peripheral portion 53 is disposed on the inner peripheral side with respect to outer peripheral portion 52. Inner peripheral portion 53 is provided so as to cover the end on the inner peripheral side of permanent magnet 26 and exposed in end face 21a and end face 21b. Inner peripheral portion 53 is provided so as to collectively cover sets of adjacent permanent magnets 26 (the set of permanent magnets 26A and 26B, the set of permanent magnets 26C and 26D, the set of permanent magnets 26E and 26F, the set of permanent magnets 26G and 26H, the set of permanent magnets 26I and 26J, the set of permanent magnets 26K and 26L, the set of permanent magnets 26M and 26N, the set of permanent magnets 26O and 26P).

Intermediate portion 56 is provided so as to connect between inner peripheral portion 53 and outer peripheral portion 52. Intermediate portion 56 is provided so as to extend from inner peripheral portion 53 through between permanent magnets 26 collectively covered by inner peripheral portion 53 (for example, between permanent magnet 26A and permanent magnet 26B) to reach outer peripheral portion 52. Intermediate portion 56 is formed so as to extend in the radial direction centering on central axis 101.

Gap filling portion 54 and cover portion 55 are disposed inside through hole 27. Gap filling portion 54 is provided so as to fill the gap between the inner wall of through hole 27 and magnet 26. Cover portion 55 is provided so as to cover the inner peripheral side of permanent magnet 26. Outer peripheral portion 52 and inner peripheral portion 53 disposed on end face 21a are connected via gap filling portion 54 and cover portion 55 to outer peripheral portion 52 and inner peripheral portion 53, respectively, disposed on end face 21b.

Permanent magnet 26 is fixed within through hole 27 by resin molding portion 51 having the above-described configuration. Furthermore, resin molding portion 51 causes the compression force along the axial direction of central axis 101 to act on end face 21a and end face 21b, to integrally hold rotor core 21 consisting of a plurality of electromagnetic steel plates 22.

In the cooling structure of motor generator 10 in the present embodiment, an oil passage 28 is formed inside through hole 27. Oil passage 28 is formed to extend in the axial direction of central axis 101 and pass through rotor core 21. Oil passage 28 is formed so as to be open to end face 21a and end face 21b. Oil passage 28 is formed in broad width portion 27j of through hole 27.

Cover portion 55 is disposed on the outer peripheral side of oil passage 28. In other words, the inner wall of oil passage 28 on the outer peripheral side is formed by a surface 55a of cover portion 55. Cover portion 55 is provided to extend over the entire length of oil passage 28 between end face 21a and end face 21b. Oil passage 28 and permanent magnet 26 are provided to have cover portion 55 interposed therebetween. Cover portion 55 serves to define the space in oil passage 28 on the inner peripheral side centering on central axis 101 while fixing permanent magnet 26 on the outer peripheral side centering on central axis 101.

Figure 4:
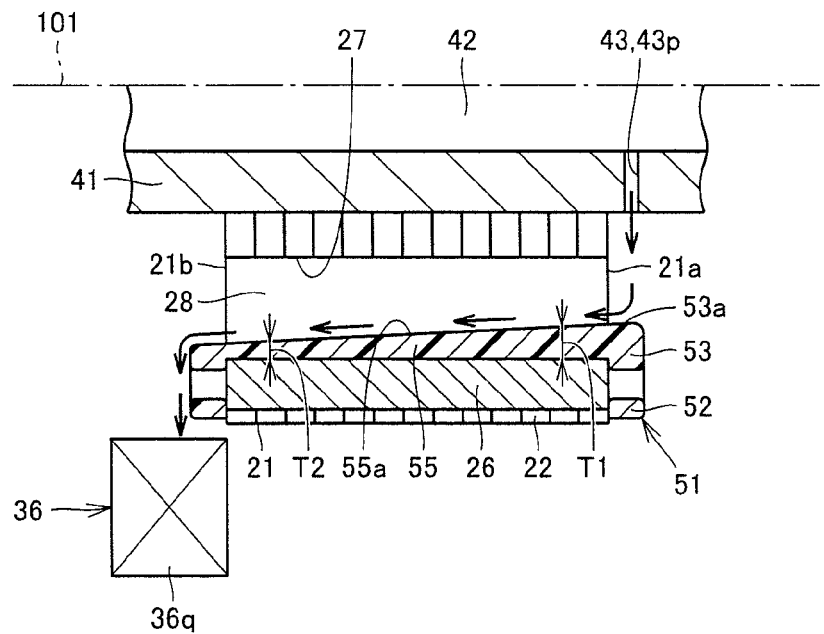
FIG. 4 is a cross sectional view showing the cooling structure of the motor generator in FIG. 1.

FIG. 4 is a cross sectional view showing the cooling structure of the motor generator in FIG. 1. Referring to FIGS. 2 to 4, a plurality of oil supply holes 43 are provided spaced apart from each other in the circumferential direction centering on central axis 101.

Oil supply hole 43 is provided so as to extend in the radial direction centering on central axis 101 and pass through between hollow portion 42 and its external space. Oil supply hole 43 is formed so as to be open directly above end face 21a in the axial direction of central axis 101. Oil supply hole 43 is formed corresponding to each set of adjacent permanent magnets 26 (the set of permanent magnets 26A and 26B, the set of permanent magnets 26C and 26D, the set of permanent magnets 26E and 26F, the set of permanent magnets 26G and 26H, the set of permanent magnets 26I and 26J, the set of permanent magnets 26K and 26L, the set of permanent magnets 26M and 26N, and the set of permanent magnets 26O and 26P) around central axis 101. Oil supply hole 43 is formed in the center phase position of adjacent permanent magnets 26 (for example, the phase position centered between permanent magnet 26A and permanent magnet 26B).

Inner peripheral portion 53 is provided on end face 21a and end face 21b and along the edge on the outer peripheral side of the opening plane of oil passage 28. Inner peripheral portion 53 has a surface 53a facing, above end face 21a and end face 21b, oil supply hole 43 in the radial direction centering on central axis 101. Surface 53a is formed continuously from surface 55a of cover portion 55.

Cover portion 55 is formed to have a thickness that is greater on the end face 21a side than on the end face 21b side (T2<T1). Cover portion 55 is formed such that the distance between central axis 101 and surface 55a is relatively decreased on the end face 21a side and relatively increased on the end face 21b side. Cover portion 55 is formed such that surface 55a is inclined with respect to central axis 101 so as to cause an increase in diameter as approaching end face 21b from end face 21a.

In the cooling structure of motor generator 10 configured in this way, the oil introduced by oil pump 48 into hollow portion 42 is supplied onto end face 21a through oil supply hole 43. The oil supplied onto end face 21a is scattered to the outer peripheral side by the centrifugal force produced in accordance with rotation of rotor core 21. The oil impinges on surface 53a of inner peripheral portion 53, thereby being guided from above end face 21a into oil passage 28. The oil flows from the end face 21a side along surface 55a of cover portion 55 toward the end face 21b side, during which the oil cools rotor core 21.

In this case, since the outer periphery of oil passage 28 is covered by cover portion 55, the oil subjected to the centrifugal force can be prevented from passing through the gap between electromagnetic steel plates 22 and entering between rotor core 21 and stator core 31.

Furthermore, surface 55a of cover portion 55 inclines from the end face 21a side toward the end face 21b side, which allows the oil to smoothly circulate through oil passage 28. Furthermore, since separation between oil passage 28 and permanent magnet 26 is provided only by cover portion 55, it becomes possible to efficiently cool permanent magnet 26 that generates the highest heat during rotation of rotor core 21.

The oil having circulated through oil passage 28 is discharged onto end face 21b and further scattered toward the outer peripheral side by the centrifugal force. Consequently, the oil cools coil end portion 36q disposed in the position where the oil is scattered.

The cooling structure of motor generator 10 in the first embodiment of the present invention as described above includes rotor core 21 consisting of a plurality of electromagnetic steel plates 22 as laminated steel plates, and resin molding portion 51 molding rotor core 21 with resin. Rotor core 21 is provided with through hole 27 passing therethrough in the direction of the rotation axis (the axial direction of central axis 101). Rotor core 21 is provided with oil passage 28 inside through hole 27 as a coolant passage through which the oil circulates as a coolant. Resin molding portion 51 has cover portion 55 covering the outer peripheral side of oil passage 28.

According to the cooling structure of motor generator 10 in the first embodiment of the present invention configured in this way, cover portion 55 disposed on the outer peripheral side of oil passage 28 can prevent the oil circulating through oil passage 28 from entering between rotor core 21 and stator core 31. Consequently, the drag resistance of the oil can be prevented from occurring between rotor core 21 and stator core 31.

Furthermore, in the present embodiment, resin molding portion 51 is provided with cover portion 55 integrally holding rotor core 21 consisting of the plurality of electromagnetic steel plates 22 and fixing permanent magnet 26 to rotor core 21. Accordingly, cover portion 55 can be collectively provided in the process of molding rotor core 21 with resin, so that the above-described cooling structure can be manufactured at low cost.

An explanation has been given in the present embodiment with regard to the case where the cooling structure of the rotating electric machine according to the present invention is applied to the motor generator mounted in a hybrid vehicle. However, without being limited thereto, the cooling structure of the rotating electric machine may be applied to a motor mounted in an electric vehicle or a commonly used industrial motor.

Second Embodiment

Figure 5:
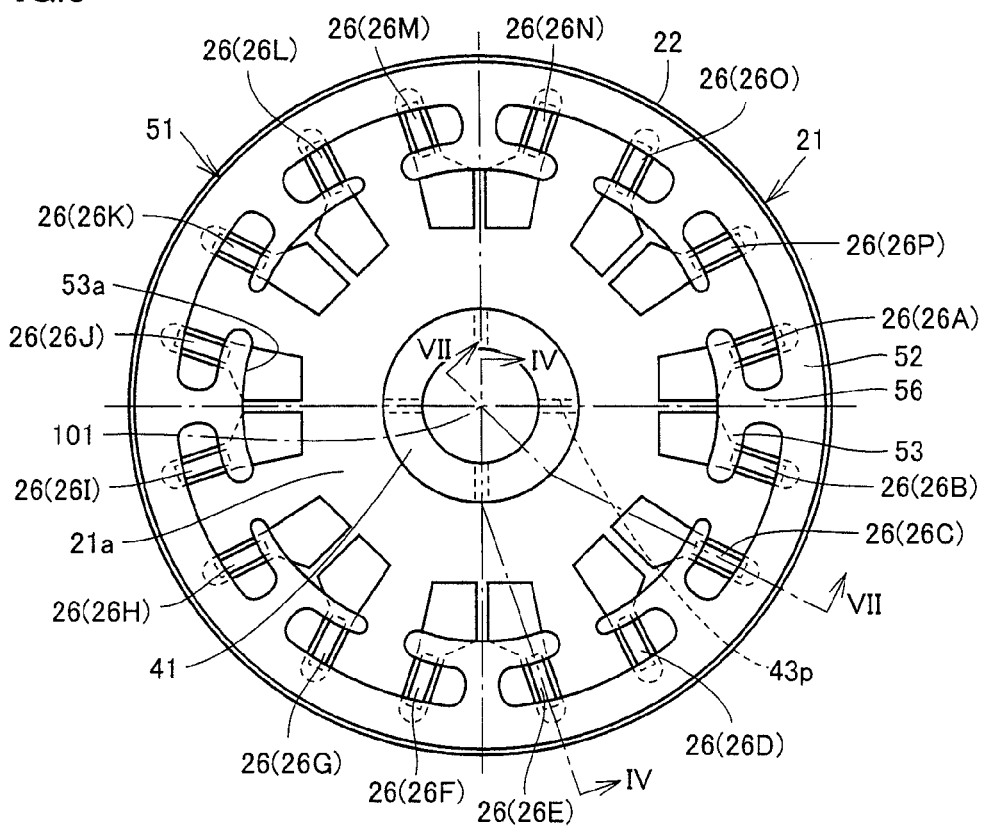
FIG. 5 is an end view showing the cooling structure of the motor generator in the second embodiment of the present invention.
Figure 6:
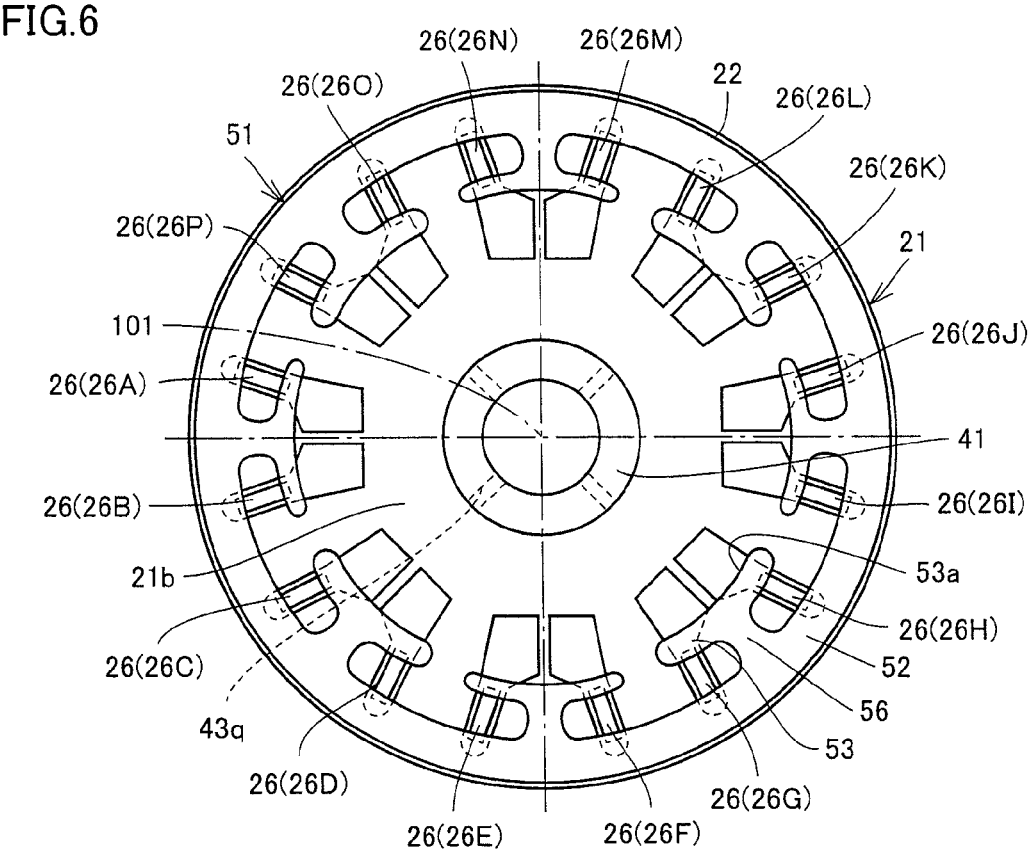
FIG. 6 is another end view showing the cooling structure of the motor generator in FIG. 5.
Figure 7:
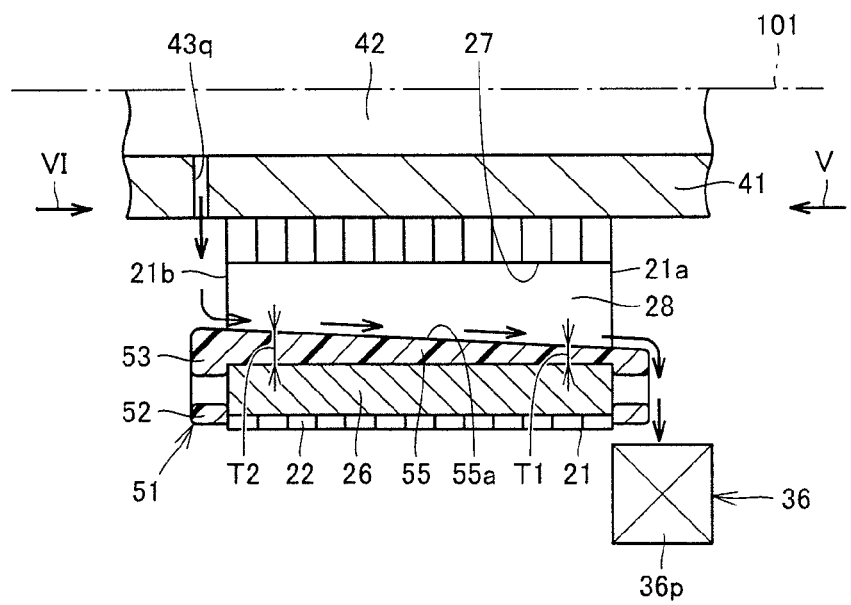
FIG. 7 is a cross sectional view showing the cooling structure of the motor generator in FIG. 5.

FIG. 5 is an end view showing the cooling structure of the motor generator in the second embodiment of the present invention. FIG. 6 is another end view showing the cooling structure of the motor generator in FIG. 5. FIG. 7 is a cross sectional view showing the cooling structure of the motor generator in FIG. 5.

The motor generator as seen in the direction shown by an arrow V in FIG. 7 is shown in FIG. 5 while the motor generator as seen in the direction shown by an arrow VI in FIG. 7 is shown in FIG. 6. The motor generator along a line IV-IV in FIG. 5 is shown in FIG. 4 while the motor generator along a line VII-VII in FIG. 5 is shown in FIG. 7.

The cooling structure of the motor generator in the present embodiment has a structure basically similar to that in the cooling structure of motor generator 10 in the first embodiment. The description of the identical structure will not be hereinafter repeated.

Referring to FIGS. 4 to 7, in the present embodiment, rotor shaft 41 is provided with an oil supply hole 43p and an oil supply hole 43q in place of oil supply hole 43 in the first embodiment. More specifically, a plurality of oil supply holes 43p are formed so as to be open directly above end face 21a in the axial direction of central axis 101 while a plurality of oil supply holes 43q are formed so as to be open directly above end face 21b in the axial direction of central axis 101.

Oil supply hole 43p and oil supply hole 43q are formed displaced from each other in the circumferential direction centering on rotation axis 101. Oil supply hole 43p is formed corresponding to the set of permanent magnets 26A and 26B, the set of permanent magnets 26E and 26F, the set of permanent magnets 26I and 26J, and the set of permanent magnets 26M and 26N. Oil supply hole 43q is formed corresponding to the set of permanent magnets 26C and 26D, the set of permanent magnets 26G and 26H, the set of permanent magnets 26K and 26L, and the set of permanent magnets 26O and 26P.

In through hole 27 through which the oil supplied from oil supply hole 43p circulates, that is, through hole 27 corresponding to the set of permanent magnets 26A and 26B, the set of permanent magnets 26E and 26F, the set of permanent magnets 26I and 26J, and the set of permanent magnets 26M and 26N, as shown in FIG. 4, cover portion 55 is provided so as to have a thickness that is greater on the end face 21a side than on the end face 21b side (T2<T1). In through hole 27 through which the oil supplied from oil supply hole 43q circulates, that is, through hole 27 corresponding to the set of permanent magnets 26C and 26D, the set of permanent magnets 26G and 26H, the set of permanent magnets 26K and 26L, and the set of permanent magnets 26O and 26P, as shown in FIG. 7, cover portion 55 is provided so as to have a thickness that is greater on the end face 21b side than on the end face 21a side (T2>T1).

In the cooling structure of the motor generator configured in this way, the oil introduced into hollow portion 42 is supplied onto end face 21a and end face 21b through oil supply hole 43p and oil supply hole 43q, respectively. As shown in FIG. 4, the oil supplied onto end face 21a and guided to oil passage 28 flows from the end face 21a side along surface 55a of cover portion 55 toward the end face 21b side. In this case, cover portion 55 satisfies the relationship of T2<T1, which allows the oil to smoothly circulate through oil passage 28. The oil having circulated through oil passage 28 is discharged onto end face 21b and further scattered by the centrifugal force toward the outer peripheral side. Consequently, the oil cools coil end portion 36q disposed in the position where the oil is scattered.

On the other hand, as shown in FIG. 7, the oil supplied onto end face 21b and guided to oil passage 28 flows from the end face 21b side along surface 55a of cover portion 55 toward the end face 21a side. In this case, cover portion 55 satisfies the relationship of T2>T1, which allows the oil to smoothly circulate through oil passage 28. The oil having circulated through oil passage 28 is discharged onto end face 21a and further scattered by the centrifugal force toward the outer peripheral side. Consequently, the oil cools coil end portion 36p disposed in the position where the oil is scattered.

According to the cooling structure of the motor generator in the second embodiment of the present invention configured in this way, the effects described in the first embodiment can be similarly achieved. Furthermore, in the present embodiment, oil supply holes 43p and 43q are formed in rotor shaft 41 while providing the inclined structure of cover portion 55 corresponding to the flow direction of the oil, thereby allowing both of coil end portion 43p and coil end portion 43q to be efficiently and uniformly cooled.

Third Embodiment

Figure 8:
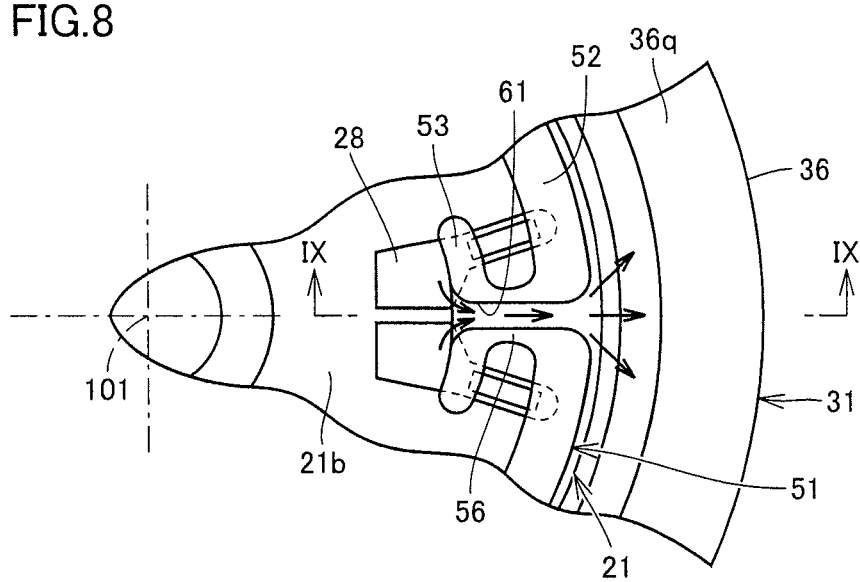
FIG. 8 is an end view showing the cooling structure of the motor generator in the third embodiment of the present invention.
Figure 9:
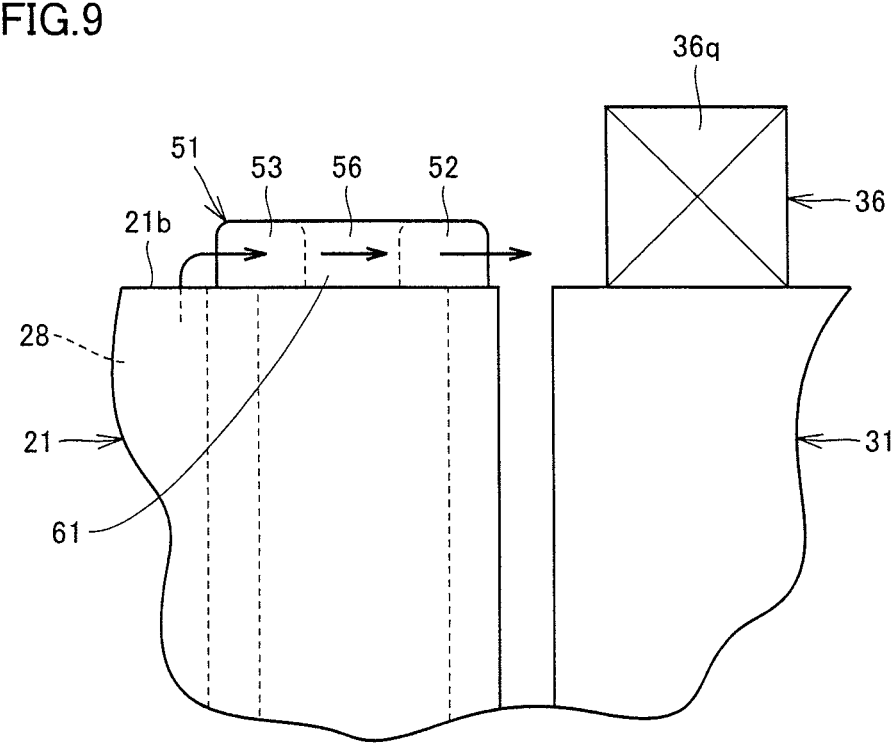
FIG. 9 is a cross sectional view showing the cooling structure of the motor generator taken along a line IX-IX in FIG. 8.

FIG. 8 is an end view showing the cooling structure of the motor generator in the third embodiment of the present invention. FIG. 8 shows the cooling structure of the motor generator as seen from the end face 21b side of rotor core 21 in FIG. 1. FIG. 9 is a cross sectional view showing the cooling structure of the motor generator taken along a line IX-IX in FIG. 8.

The cooling structure of the motor generator in the present embodiment has a structure that is basically similar to that in the cooling structure of motor generator 10 in the first embodiment. The description of the identical structure will not be hereinafter repeated.

Referring to FIGS. 8 and 9, in the present embodiment, a guide portion 61 is formed in resin molding portion 51 disposed on end face 21b. Guide portion 61 is formed in the shape of a groove extending from the opening plane of oil passage 28 in end face 21b toward the outer periphery. Guide portion 61 is formed in the shape of a groove passing through inner peripheral portion 53, intermediate portion 56 and outer peripheral portion 52 in this order while extending in the radial direction centering on central axis 101.

In the cooling structure of the motor generator configured in this way, the oil flowing through oil passage 28 and discharged onto end face 21b is guided toward coil end portion 36q by guide portion 61 having a shape of a groove. Consequently, a relatively large quantity of oil can be supplied to coil end portion 36q.

According to the cooling structure of the motor generator in the third embodiment of the present invention configured in this way, the effects described in the first embodiment can be similarly achieved. Furthermore, coil end portion 36q can be cooled further efficiently by forming guide portion 61 in resin molding portion 51.

It is to be noted that the cooling structures of the motor generators described in the first to third embodiments explained above may be combined as appropriate to configure a new cooling structure of the motor generator.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention is mainly applied to a vehicle having a motor as a power source.

REFERENCE SIGNS LIST

10 motor generator, 12 terminal block, 13 inverter, 14 battery, 15 speed reduction mechanism, 16 differential mechanism, 17 drive shaft receiving portion, 21 rotor core, 21a, 21b end face, 22 electromagnetic steel plate, 26, 26A to 26P permanent magnet, 27 through hole, 27j broad width portion, 27k narrow width portion, 28 oil passage, 31 stator core, 31a, 31b end face, 32 electromagnetic steel plate, 36 coil, 36p, 36q coil end portion, 41 rotor shaft, 42 hollow portion, 43, 43p, 43q oil supply hole, 46, 47 bearing, 48 oil pump, 51 resin molding portion, 52 outer peripheral portion, 53 inner peripheral portion, 53a, 55a surface, 54 gap filling portion, 55 cover portion, 56 intermediate portion, 61 guide portion, 101 central axis.

The invention claimed is:

1. A cooling structure of a rotating electric machine, said cooling structure comprising:
a rotor core formed of laminated steel plates, said rotor core being provided with a through hole passing therethrough in a direction of a rotation axis and being provided inside said through hole with a coolant passage through which a coolant circulates; and
a resin molding portion molding said rotor core with resin, said resin molding portion having a cover portion covering an outer peripheral side of said coolant passage, and
an inner wall on the outer peripheral side of said coolant passage being formed by a surface of said cover portion, wherein
said rotor core has a first end face and a second end face located on opposite sides of said rotor core, each of the first end face and the second end face extending in a plane orthogonal to the direction of the rotation axis, said coolant passage being open to said first end face and said second end face,
said cooling structure further comprises a coolant supply portion supplying the coolant onto said first end face, and
said cover portion is configured to have a thickness that is greater on a side of said first end face than on a side of said second end face.

2. The cooling structure of a rotating electric machine according to claim 1, wherein
said resin molding portion further has a protruding portion that is provided on said first end face and said second end face so as to extend along an edge on an outer peripheral side of an opening plane of said coolant passage, said protruding portion protruding in the direction of the rotation axis of said rotor core.

3. A cooling structure of a rotating electric machine, said cooling structure comprising:
a rotor core formed of laminated steel plates, said rotor core being provided with a through hole passing therethrough in a direction of a rotation axis and being provided inside said through hole with a coolant passage through which a coolant circulates; and
a resin molding portion molding said rotor core with resin, said resin molding portion having a cover portion covering an outer peripheral side of said coolant passage, and
an inner wall on the outer peripheral side of said coolant passage being formed by a surface of said cover portion, wherein
said rotor core has a first end face and a second end face located on opposite sides of said rotor core, each of the first end face and the second end face extending in a plane orthogonal to the direction of the rotation axis, said coolant passage being open to said first end face and said second end face,
a plurality of said through holes are provided spaced apart from each other in a circumferential direction centering on the rotation axis of said rotor core,
said cooling structure further comprises:
a first coolant supply portion supplying the coolant onto said first end face; and
a second coolant supply portion supplying the coolant onto said second end face, and said first coolant supply portion and said second coolant supply portion are located displaced from each other in the circumferential direction centering on the rotation axis of said rotor core.

4. The cooling structure of a rotating electric machine according to claim 3, wherein said through hole through which the coolant supplied from said first coolant supply portion circulates is provided with said cover portion configured to have a thickness that is greater on a side of said first end face than on a side of said second end face, and said through hole through which the coolant supplied from said second coolant supply portion circulates is provided with said cover portion configured to have a thickness that is greater on the side of said second end face than on the side of said first end face.

5. The cooling structure of a rotating electric machine, said cooling structure comprising:
　　a rotor core formed of laminated steel plates, said rotor core being provided with a through hole passing therethrough in a direction of a rotation axis and being provided inside said through hole with a coolant passage through which a coolant circulates; and
　　a resin molding portion molding said rotor core with resin, said resin molding portion having a cover portion covering an outer peripheral side of said coolant passage, and
　　an inner wall on the outer peripheral side of said coolant passage being formed by a surface of said cover portion,
　　said cooling structure further comprising a magnet inserted into said through hole, wherein
　　said resin molding portion is provided so as to fill a space between said magnet and an inner wall of said through hole, and
　　said magnet and said coolant passage are disposed inside said through hole so as to have said cover portion interposed between said magnet and said coolant passage.

6. The cooling structure of a rotating electric machine according to claim 1, wherein
　　said resin molding portion is provided continuously between said first end face and said second end face while covering said first end face and said second end face, to integrally hold said rotor core formed of the laminated steel plates.

7. The cooling structure of a rotating electric machine according to claim 5, said cooling structure further comprising:
　　a stator core disposed on an outer periphery of said rotor core and having an end face facing in the direction of the rotation axis of said rotor core; and
　　a coil wound around said stator core and having a coil end portion positioned on said end face.

8. The cooling structure of a rotating electric machine according to claim 7, wherein
　　said rotor core has a first end face and a second end face located on opposite sides of said rotor core, each of the first end face and the second end face extending in a plane orthogonal to the direction of the rotation axis, said coolant passage being open to said first end face and said second end face,
　　said cooling structure further comprises a coolant supply portion supplying the coolant onto said first end face, and
　　said resin molding portion has a guide portion disposed on said second end face and formed to guide the coolant discharged through said coolant passage toward said coil end portion.

* * * * *